US011490314B2

(12) United States Patent
Rahman

(10) Patent No.: US 11,490,314 B2
(45) Date of Patent: Nov. 1, 2022

(54) HANDOVER OPTIMIZATION DURING 5G TO 4G MOBILITY

(71) Applicant: T-Mobile USA, Inc., Bellevue, WA (US)

(72) Inventor: Muhammad Tawhidur Rahman, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/017,305

(22) Filed: Sep. 10, 2020

(65) Prior Publication Data

US 2022/0078690 A1 Mar. 10, 2022

(51) Int. Cl.

| | |
|---|---|
| ***H04W 36/32*** | (2009.01) |
| ***H04W 24/10*** | (2009.01) |
| ***H04W 36/00*** | (2009.01) |
| ***H04W 76/27*** | (2018.01) |
| ***H04B 17/318*** | (2015.01) |

(52) U.S. Cl.

CPC .......... *H04W 36/32* (2013.01); *H04B 17/318* (2015.01); *H04W 24/10* (2013.01); *H04W 36/0022* (2013.01); *H04W 36/0058* (2018.08); *H04W 76/27* (2018.02)

(58) Field of Classification Search

CPC . H04W 36/0022; H04W 36/14; H04W 36/32; H04W 36/0085; H04W 36/0088; H04W 36/0016; H04W 36/08; H04W 48/18; H04W 36/0072; H04W 24/10; H04W 76/27; H04W 36/0058; H04B 17/318; H04B 17/24; H04B 17/382

See application file for complete search history.

(56) References Cited

U.S. PATENT DOCUMENTS

| | | | | |
|---|---|---|---|---|
| 2013/0003591 | A1* | 1/2013 | Novak | H04W 36/06 370/252 |
| 2018/0124661 | A1* | 5/2018 | Tsai | H04W 36/06 |
| 2018/0160362 | A1* | 6/2018 | Raghunathan | H04W 76/28 |
| 2019/0306739 | A1* | 10/2019 | Kim | H04W 52/0229 |
| 2019/0342804 | A1* | 11/2019 | Futaki | H04W 36/0069 |
| 2020/0305014 | A1* | 9/2020 | Kim | H04W 76/19 |

* cited by examiner

*Primary Examiner* — Quoc Thai N Vu
(74) *Attorney, Agent, or Firm* — Loeb & Loeb LLP

(57) ABSTRACT

A system and method may improve service setup time and reliability for user equipment (UE) fallback procedures in cellular networks. Logic in the UE may define an event to trigger a measurement report and send that measurement report to the base station upon initiating fallback procedures. This event and measurement report may allow the 5G base station (g-NB) to know which frequency is going to be the best choice at the time of setting up the voice service by looking at radio signal strength indicators coming from the 5G UE for each frequency in the measurement report. Incorporating the measurement report process into the logic of the UE for call setup that also includes the fallback process for may result in substantially faster call setup time as well as better voice call success rate.

20 Claims, 4 Drawing Sheets

400

UE Connection Mode? (402)
CONNECTED or IDLE
INACTIVE
Request or re-establish voice services (404)
Compile Measurement Report (406)
Send measurement report to base station (408)
Connect (410)

400

HANDOVER OPTIMIZATION DURING 5G TO 4G MOBILITY

BACKGROUND

The background description provided herein is for the purpose of generally presenting the context of the disclosure. The work of the presently named inventors, to the extent it is described in this background section, as well as aspects of the description that may not otherwise qualify as prior art at the time of filing, are neither expressly nor impliedly admitted as prior art against the present disclosure.

Fifth Generation or "5G" cellular networks offer significant improvements over earlier cellular network designs including much higher data rates (1-20 Gigabits per second), much lower data latency (e.g., 1 millisecond), and increased capacity as the network expands. 5G consists of an array of technologies to meet these goals including antenna and cellular tower design, a larger frequency spectrum, and software implemented by various carriers to improve the capabilities of their subscribers. For example, carriers may modify any one of the processes involved in cellular network management (e.g., user equipment (UE) registration, etc.) to make slight improvements in data rates, latency, or network capacity that, collectively, contribute significant improvements in cellular network improvements.

One aspect of current 5G networks is their reliance on 4G networks to provide some services such as voice when those service are not available in a 5G base station. Evolved Packet System ("EPS") Fallback enables phones to use the 5G core with "new radio" (NR) before all 5G voice features are in place on the UE and in Next Generation Radio Access Networks (NG-RAN) and before the NG-RAN is dimensioned and tuned for the 5G voice service. During call establishment, the UE is moved from NR (5G) to LTE (4G) and the voice service is then established on 4G. In sum, 5G UE initiates the voice service in 5G, but fulfills the service on 4G.

However, this handoff procedure significantly increases the chances of voice service delays and failures when the 4G LTE signal strength is intermittent, weak and/or causes loss-of-signal on the 5G UE. These problems typically occur in UEs making Voice over New Radio (VoNR) calls from the 5G cell edge. These calls have a high risk of experiencing bad call quality, and in the worst case, a call drop. To prevent this the UE is forced during the voice call setup towards 5G core network (5GC) to switch to a LTE/EPS connection where the radio conditions are better for the voice service. The same procedure for which the term "EPS Fallback" was coined by 3GPP also applies when the UE is served by a 5G cell that is not configured/not optimized for VoNR calls or when the UE does not have all needed VoNR capabilities.

EPS fallback may be accomplished in a few ways. For example, the 5G radio connection may be released after the initial voice service attempt is successfully finished. The base station may then send a control signal to the UE for reselecting to a 4G cell where a new radio connection is started for the Voice Over LTE (VoLTE) call. In this case, the UE context is transferred from the AMF to the MME over the N26 interface. Another example of EPS fallback may include a 5G-4G inter-RAT handover. Here, the session management and user plane tunnels in the core network are handed over from SMF/UPF to MME/S-GW. This method may be realized with the GTPv2 Forward Relocation procedure on N26 interface. Each of these methods may incur an additional call setup delay of approximately 2 seconds.

These failings of the 5G/4G "fallback" process present a technical problem. For example, it is often difficult for the 5G base station to initiate the 4G service with an intermittent or weak 4G signal. Further, once a 5G UE succeeds in starting voice services over a weak 4G LTE signal, then ends that service over 4G or the service fails due to the weak signal, the 5G UE may continue the service and all other services (e.g., data services, location services, etc.) over the 4G LTE band (e.g., mid-band: 2.5 GHz) instead of switching back to a 5G low-band for those other services. In addition to network latency differences between 4G and 5G connections, having the 5G UE camped or "stuck" on a 4G network could add extra delay to services such as voice call setup and may also contribute to additional service failures (e.g., call setup failures). Additional issues may arise in other critical procedures like E911 call setup, data sessions (YouTube, Netflix, etc.), handover from 5G standalone ("SA") to 4G LTE and future 5G Ultra-reliable Low-latency Communications ("URLLC"). Current systems may also cause failures in future services such as Voice Over NR (VoNR).

The EPS fallback decision made by the base station is guided by measurement reports from the UE. Past systems include various measurement items such as Reference Signal Received Power or "RSRP," Reference Signal Received Quality or "RSRQ," Signal-to-Noise and Interference Ratio or "SINK") and multiple ways (periodic, event triggered) to measure the signal quality of the serving cell and neighbor cells. In Ideal case, a base station shall allow UE to report serving cell and neighbor cell signal quality and trigger the handover with single measurement, but in practice it can create overload conditions due to unnecessary ping pong handovers. To avoid this, 3GPP specifications have proposed a set of predefined "measurement report" mechanisms to be performed by the UE (see 3GPP specification 38.331 available at https://portal.3gpp.org/desktopmodules/Specifications/SpecificationDetails.aspx?specificationId=3197). These predefined measurement reports are triggered by "events." The type of "event" a UE reports is specified by an RRC control signal message sent by the base station to the UE. However, because the current system relies on the base station to trigger these measurement report events at the UE, the best information for the fallback procedure will not be available when the UE requests call initiation, thus, the EPS fallback procedure may still experience setup delays and signal drops.

SUMMARY

The following presents a simplified summary of the present disclosure in order to provide a basic understanding of some aspects of the disclosure. This summary is not an extensive overview. It is not intended to identify key or critical elements of the disclosure or to delineate its scope. The following summary merely presents some concepts in a simplified form as a prelude to the more detailed description provided below.

To solve the technical problem described above, logic in the 5G UE may send a measurement report to the 5G base station (i.e., gNB) while the 5G SA UE is going through a call setup using VoEPSFB. This new type of event and measurement report may convey the most current available frequencies (3G, 4G, 4G LTE, etc.) to the 5G base station while the 5G UE is going through a call setup. This measurement report may allow the 5G base station (g-NB) to know which frequency is going to be the best choice at the time of setting up the voice service by looking at radio signal strength indicators coming from the 5G UE for each frequency in the measurement report. That way, a 5G base station can make the right choice to automatically send a control signal to the 5G UE to join the optimal LTE frequency instead of sending a blind choice of any available 4G frequency based on prior measurement reports that frequently include out-of-date information. Using the measurement report sent by the UE upon voice services initiation, the 5G base station may optimally control 5G UE without having available frequencies to support the requested service (e.g., voice services) in 5G NR. The 5G base station may cause the 5G UE to move to a strong and reliable radio signal strength indicated in the measurement report to make voice calls over 4G using that stronger signal. As such, the 5G UE may have faster call setup time by having such enhanced logic in 5G UE so that it proactively helps the 5G base station to assign it to the right frequency during a voice call setup. Incorporating the measurement report process into the logic of the 5G UE for call setup that also includes the fallback process for 5G UE may result in substantially faster call setup time as well as better voice call success rate.

In further embodiments, an apparatus for completing a fallback process between a base station and a user equipment in a cellular network may include a modified user equipment including a processor and a memory storing instructions for execution by the processor for the fallback process. The apparatus may include an instruction for determining a signal strength for each of a plurality of frequencies being received by the user equipment and generating a measurement report including the signal strength for each of the plurality of frequencies being received by the user equipment. The user equipment may also include instructions for sending the measurement report to a base station upon sending a request to initiate a service corresponding to the measurement report. The base station may be configured to automatically send a control signal to the user equipment in response to determining that a frequency for the service is not supported by the base station. The control signal may include further instructions for receiving the service at the user equipment by attaching to an optimal one of the plurality of frequencies at the user equipment based on the signal strengths indicated by the measurement report.

In still further embodiments, a computer-implemented method may complete a fallback process between a base station and a user equipment in a cellular network. The method may determine a signal strength for each of a plurality of frequencies being received by the user equipment and generate a measurement report including the signal strength for each of the plurality of frequencies being received by the user equipment. The user equipment may then send the measurement report to a base station upon sending a request to initiate a service corresponding to the measurement report. The method may then receive a control signal from the base station at the user equipment in response to determining that a frequency for the service is not supported by the base station. The control signal may cause the user equipment to receive the service at the user equipment by attaching to an optimal one of the plurality of frequencies at the user equipment based on the signal strengths indicated by the measurement report.

BRIEF DESCRIPTION OF THE DRAWINGS

The figures depict a preferred embodiment for purposes of illustration only. One skilled in the art may readily recognize from the following discussion that alternative embodiments of the structures and methods illustrated herein may be employed without departing from the principles described herein.

DETAILED DESCRIPTION

The present application describes embodiments including various elements that are present in a mobile telecommunications network such as modules, blocks, functions, data structures, etc. These elements are not an exhaustive collection of all elements needed to perform the functions of a mobile telecommunications network (i.e., 5G handoff to a 4G frequency) or the disclosed embodiments. Indeed, the elements associated with the systems and methods described in this application are only some of the possible elements that are needed to implement the embodiments. Some embodiments may include more or fewer elements than those that are described with the embodiments, as known by a person having ordinary skill in the art of mobile telecommunications systems.

The present application describes a technical solution to the technical problem of frequency handoff from 5G to 4G when a 5G UE requests services that are not supported by the 5G base station and the 5G UE must switch or "fallback" to a 4G frequency. The present application solves this technical problem by modifying the typical 5G UE fallback process so that the 5G base station no longer relies on blindly choosing any available 4G frequency from prior measurement reports for the fallback procedure. The 5G UE may send a "Measurement Report" to a 5G base station (i.e., gNB) at the time of call setup using VoEPSFB. The measurement report may convey available LTE frequencies and their signal strength to the 5G base station upon initiating or requesting voice services. This measurement report may allow the 5G base station (g-NB) to know which frequency in LTE is going to be the best choice at the time of setting up the voice service by looking at radio signal strength indicators coming from the 5G UE for each frequency in the measurement report. That way, a 5G base station can automatically send a control signal to the 5G UE to join the optimal LTE frequency instead of sending a choice based on other factors that do not influence service success or based on no factors at all. Using the measurement report, the 5G base station may optimally control 5G UE without having available frequencies to support the requested service (e.g., voice services) in 5G NR. The 5G base station may cause the 5G UE to move to a strong radio signal strength indicated in the measurement report to establish a service requiring a previous generation specification (e.g., 4G, 4G LTE, 3G, etc.) or other specification using that stronger signal. The 5G UE may then have faster call setup time by having such enhanced logic in 5G UE so that it proactively helps the 5G base station to assign it to the right frequency during a voice call setup. Incorporating the measurement report into the call setup process during a fallback for 5G UE may result in substantially faster call setup time as well as better voice call success rate.

Figure 1:
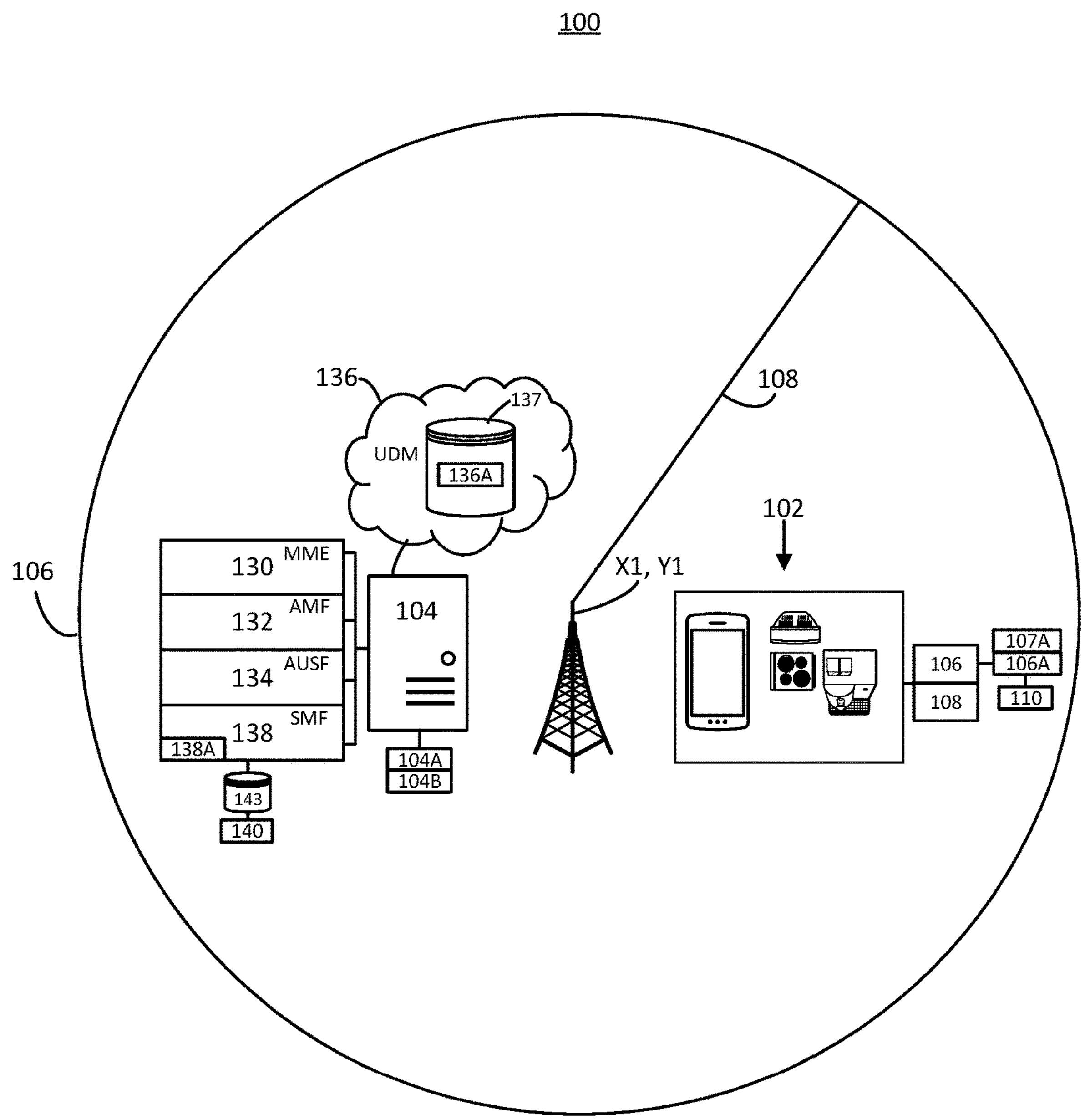
FIG. 1 is an illustration of an exemplary system for moving 5G UE to 4G LTE in accordance with the current disclosure.

FIG. 1 illustrates a system 100 supporting operation of user equipment (UE) 102 in a cellular communication system generally and, in particular, facilitating a computer-implemented process for 5G fallback procedures between the UE 102 with the system 100 as described herein. The UE 102 may be any electronic device that is capable of sending, receiving, and/or processing a 5G radio signal for communicating data from the UE 102 to other UEs (not shown) via the base station 104. In some embodiments, the UE 102 includes a cellular telephone, a smartphone, a smart watch, an Internet of Things device, a computing device, etc. The UE 102 may be categorized or grouped along various characteristics including device capabilities and network services. For example, in some embodiments, the UE 102 may include a smartphone UE 102A, an Internet of Things UE 102B, etc.

The UE 102 may include a memory 106 storing instructions for execution on a processor 108 to generate and send a measurement report 110 at the time of call setup. For example, the memory 106 may include a fallback module 106A including various instructions for execution by the processor 108 to generate and send a measurement report 110 and a UE voice services module 107A to request and maintain voice services with the base station 104 using a base station voice services module 105. The measurement report 110 may include data indicating frequencies that are currently being received by the UE 102, a signal strength for each of those frequencies, an indication of a standard for the signal (e.g., 4G LTE, 4G, 3G, etc.), a duration of signal reception at the UE 102, a measure of signal reliability either at the UE 102 or other data that may be determined from past measurement reports 110, among other information. In some embodiments, the signal strength is indicated in decibel-milliwatts (dBm) in the measurement report. In some embodiments, frequency is indicated on the measurement report 110 in gigahertz (GHz). In other embodiments, frequency may be indicated in any other suitable units of measurement.

The Radio Resource Control (RRC) protocol is used to control radio connections between the UE 102 and the base station 104. This protocol may form some of the instructions of the UE voice services module 107A. A state machine defines states for the UE 102 and guides operation of the RRC. Instructions for executing this state machine may be distributed between the UE 102 and the base station 104, or may form at least some of the instructions of the voice services module 107A of the UE 102. The different states in this state machine have different amounts of radio resources associated with them and these are the resources that the UE 102 may use when it is present in a given specific state. A 5G-configured UE 102 has three different RRC states: inactive, idle, and connected. When the UE 102 is powered up, it is in disconnected mode/idle mode. Upon initially attaching to the base station 104 or connection re-establishment with the base station 104, the UE 102 moves to the "connected" state. If there is no activity from the UE for a pre-configured amount of time, the UE 102 suspends its session with the base station 104 and moves to "inactive." In the inactive state, the UE 102 maintains its connection to the base station 104, but also minimizes signaling and power consumption. Upon resuming the session, the UE 102 moves to "connected." The UE may move to "idle" from "connected" when ending the session or to "inactive" after a period of time to also minimize power consumption.

Processor-executable instructions stored in the memory 106 (i.e., the fallback module 106A, the UE voice services module 107A, etc.) may include instructions to generate the measurement report 110 and send the report 110 to the base station 104 in response to initiating voice services procedures by the UE 102 generally and the UE voice services module 107A in particular. These instructions may be incorporated into the state machine of the RRC protocol. For example, the fallback module 106A may include instructions to periodically determine the measurement report 110 or determine the measurement report 110 in response to a remote or local control signal as part of the RRC state machine. In other embodiments, the instructions of the fallback module 106A may include periodically or responsively sending only a portion of the measurement report 110. For example, the instructions of the fallback module 106A may include only sending an indication of the strongest signal from the measurement report 110, only those that are compatible with the capabilities of the base station 104, etc., at the time of call setup using VoEPSFB.

Each UE 102 may belong to one or more of the UE groups each having its own user equipment group identification. Thus, each UE 102 may include its own UE ID and belong to a group of UEs having a single UE group ID associated with all UEs that are members of the group. For example, internet-of-things UE may have a different UE ID than a smartphone UE, or other types of UE. The UE 102 may be subscribed to a mobile network operator (MNO) that maintains the network base station 104. A subscriber may be an entity who is party to a contract with the MNO for access to public telecommunications services. Different MNOs may support different network standards and capabilities. While FIG. 1 only shows one base station 104 and two UE types, the embodiments described herein apply equally to systems having different numbers of base stations, corresponding MNOs, UEs, etc. The UE is able to maintain connectivity beyond the coverage area 106 of the network base station 104 shown in FIG. 1 despite only the network base station 104 being maintained by a network MNO having a contract for telecommunications services with a subscriber corresponding to the UE 102. For example, the UE 102 may move out of range of the coverage area 106 and into range of an adjacent coverage area corresponding to another base station with different capabilities. When a 5G SA UE moves from a base station 104 that supports 5G NR services to one that only supports 4G LTE, upon initiating a request for voice services on the 4G LTE base station, the UE voice services module 107A may send a control signal to the fallback module 106A for generating a measurement report and sending the report to the 4G LTE base station to identify the best fallback frequency and initiate voice services using that frequency with a base station voice services module.

A base station 104 may be maintained by a mobile network operator (MNO) corresponding to the UE 102. The network base station 104 may include a processor 104A and a memory 104B storing processor-executable instructions and data to facilitate a UE 5G/4G fallback process, as described herein. The network base station may also include processor-executable instructions to facilitate the MNO registering UEs and maintaining the network. For example, the memory 1046 may include data to define a coverage area 106 having a center point X1, Y1 and having a radius 108. The base station 104 may also have one or more radios supporting communication with the UE 102. The base station 104 may also include one or more radios operating at different frequency bands and cellular communications standards (e.g., 4G, 5G, etc.) supporting communication with the UE 102 as well as other processors and memories storing processor-executable instructions for implementing the various modules, blocks, functions, data structures, etc., as herein described. The memory 104B may include a base station voice services module 105 including instructions for execution by the processor 104B to initiate and maintain voices services including receiving a measurement report 110 from the UE fallback module 106A or the UE voice services module 107A upon the 5G UE 102 requesting voice services from the UE voice services module 107A.

The system 100 generally and the fallback module 106A of the UE 102 in particular may include processor-executable instructions to automatically identify signals that are currently accessible for the UE 102, determine a signal strength for each of those signals, and determine a reliability measurement for each signal, and other metrics for the measurement report 110. The module 106A may also include instructions to receive a control signal from the UE voice services module 107A which causes the processor 108 of the UE 102 to execute instructions to send the measurement report 110 to the base station 104 and the base station voice services module 105. In some embodiments, the processor 104A may execute instructions of the memory 1046 to automatically send a control signal to the user equipment in response to receiving the measurement report 110 that indicates a best frequency for initiating voice services with the UE. The control signal may be for receiving the service at the user equipment using one of the plurality of frequencies of the measurement report 110 at the user equipment based on the signal strengths indicated by the measurement report. In further embodiments, when the UE requests a service that is not supported by a communication standard for current communication between the base station 104 and a UE 102 and fall back is required, the UE 102 may send a control signal for receiving the service at the user equipment using one of the plurality of frequencies at the user equipment based on the signal strengths indicated by the most recent measurement report.

The base station 104 may include several modules or entities (130, 132, 134, 136, 138) with processor-executable instructions for facilitating an authentication and registration process with the UE 102. While this disclosure describes five modules (i.e., a Mobile Management Entity (MME) 130, an Access and Mobility Management Function (AMF) 132, an Authentication Server Function (AUSF) 134, a Unified Data Management (UDM) entity 136, and a Session Management Function (SMF) 138) to facilitate the authentication and registration processes, persons of ordinary skill in the art will recognize that additional modules and functions may be required to complete these processes (see, e.g., Procedures for the 5G System (5GS) 3GPP TS 29.502 (available at: https://portal.3gpp.org/desktopmodules/Specifications/SpecificationDetails.aspx?specificationId=3145). Likewise, functionality of the module or entities may be implemented by a processor executing processor-executable instructions.

Each MNO maintains a Mobile Management Entity (MME) 130 for the respective base station 104, including a Location Register (HLR) for their base stations 104. The HLR is a database for the MNO in which information from all mobile subscribers is stored. The HLR contains information about the subscribers identity, telephone number, the associated services for the number or account, and general information about the location of the subscriber. The exact location of the subscriber is kept in a Visitor Location Register (VLR), as described below. The MME 130 is the key control node for the system 100 providing mobility and session management in 4G systems. The MME 130 includes instructions for idle mode paging and tagging procedure including retransmissions for the UE 102. The MME 130 also includes instructions for activation/deactivation processes and also instructions for choosing the gateway and base station for the UE 102 at the initial attach and at the time of intra-LTE handover involving Core Network (CN) node relocation. The MME 130 also includes instructions for authenticating the user by interacting with the respective base station 104.

In 5G systems, the Access and Mobility Management Function (AMF) 132 may serve part of the role of the MME 130 (i.e., mobility management). The AMF 132 may maintain a Non-Access Stratum (NAS) signaling connection with the UE 102 and manage the UE registration procedure. The AMF 132 may also be responsible for paging. In some embodiments, the AMF 132 may include instructions to store configuration and subscription data for the UE 102 in a local configuration and subscription data repository.

Subscriber authentication, during registration or re-registration with 5G, may be managed by the Authentication Server Function (AUSF) 134. The AUSF may include processor-executable instructions 134A for managing subscriber authentication during 5G registration. In some embodiments, during registration of the UE 102, the AUSF may obtain various data or authentication vectors from a local data repository (e.g., Session Management Function Data 140, 141, 142 from the Session Management Function data repository 143, etc.). The Session Management Function Data 140, 141, 142 may include one or more of SMF Selection Subscription Data and Session Management Subscription Data, including a Data Network Name array, and other data needed to complete the authentication and registration processes of various UE 102. In further embodiments, the base station 104 may retrieve the Session Management Function Data 140, 141, 142 from network storage and/or a cloud-based UDM 136.

A Session Management Function (SMF) 138 may provide session management functionality in 5G systems as well as some control plane functions. The SMF 138 may include instructions 138A to allocate IP addresses to the UE 102 during a registration process. The SMF 138 is primarily responsible for interacting with the decoupled data plane, creating, updating, and removing Protocol Data Unit (PDU) sessions and managing session context with the User Plane Function (UPF).

During registration of UE with the base station 104, the AMF 132 may receive registration requests from UE including the measurement report 110 and handle anything to do with connection or mobility management while forwarding session management requirements to the SMF 138. In some embodiments, the base station 104 queries the UDM 136, and the AMF may determine which SMF is best suited to handle the connection request by also querying the UDM 136. The UDM 136 may be stateless and store information externally in a Unified Data Repository (UDR) 137. Methods and entities for the UDM 136 to use services may be specified in 3GPP TS 29.504 and 3GPP TS 29.505 to retrieve configuration and subscription data and Session Management Function Data from the UDR 137 (available at https://portal.3gpp.org/desktopmodules/Specifications/SpecificationDetails.aspx?specificationId=3405 and https://portal.3gpp.org/desktopmodules/Specifications/SpecificationDetails.aspx?specificationId=3406, respectively).

Current registration methods retrieve group Session Management Function Data 140, 141, 142 from the UDR 137 for each UE 102 that registers with the system 100. The retrieved data is then stored locally before, during, or after processing an incoming UE registration request. In some embodiments, the SMF 138 may include instructions 138A to retrieve group Selection Subscription Data 140, Session Management Subscription data 141, and a Data Network Name Array 142 for registration from a local SMF data repository 143 or the cloud-based UDM 136. Processing the incoming request may then include updating one or more of the Selection Subscription Data 140, Session Management Subscription data 141, and Data Network Name Array 142 in the SMF data repository 143 or UDM 136 or subscribing to change notifications at the SMF data repository 143 by consuming the appropriate services. In further embodiments, the SMF 138 may also include instructions to perform the role of Dynamic Host Configuration Protocol (DHCP) server and IP Address Management (IPAM) system. Further, the SMF data repository 143 may maintain a record of Protocol Data Unit (PDU) session state by means of a 24 bit PDU Session ID. The SMF may also set configuration parameters that define traffic steering parameters and ensure the appropriate routing of packets while guaranteeing the delivery of incoming packets, though a Downlink (DL) data notification. The SMF 138 also includes instructions to check whether the UE requests are compliant with the user subscription and for connectivity charging, which is achieved by interacting with a Charging Function (CHF).

Processing and network latency during 5G UE registration in VoEPSFB procedures may be reduced by a modified registration process in which the 5G UE sends a measurement report as part of a fallback process for initiating voice services with a base station 104 that does not include 5G voice services. In some embodiments, entities of the system 100, may include processor-implemented instructions to store and use the measurement report 110 once it is received at the base station 104. For example, the processor-implemented instructions may include storing a measurement report 110 that is associated with each UE that requests voice services from the base station.

Each UE may include a UE ID 136A. In some embodiments, the UE ID is a pointer to the Session Management Function Data 140 corresponding to the UE 102. Session Management Function Data 140 may be stored locally. For example, the system 100 may include processor-executable instructions to store Session Management Function Data 140 at the SMF data repository 143 for the entity requesting the data for registration or other services of the system 100. The Session Management Function Data 140 may be stored locally with the SMF 138, or other entity. One or more entities of the system 100 may include instructions to pass its UE ID (e.g., subscriber identification or SUPI, a Permanent Equipment Identifier of PEI, a Globally Unique Temporary Identifier or GUTI, a subscription concealed identifier or SUCI, an Internal Group Identifier, a General Public Subscription Identifier, an access point name (APN) or a data network name (DNN) linked to its IP address, etc.) to various entities of the system 100 (e.g., one or more of the Mobile Management Entity (MME) 130, the Access and Mobility Management Function (AMF) 132, the Authentication Server Function (AUSF) 134, the Session Management Function (SMF) 138, etc.). The system 100 may cause a processor to execute these instructions when a UE 102 attempts registration with the system 100. The system 100 may include further instructions to identify the type or capabilities of the UE (e.g., 5G, 4G, etc.) using the received UE ID. For example, the SMF may include instructions to receive a UE ID during or in response to registration of the UE. The SMF may include processor-executable instructions to pass the UE ID to the UDM. The UDM 136 may include further processor-executable instructions to identify the registering UE based on or in response to the received UE ID and pass other information (capabilities, software versions, etc.) about the UE back to the system entity (i.e., the SMF 138). The SMF 138 or other system entity may include further instructions to use the received UE ID to access and apply locally-stored Session Management Function Data 140 for the registering UE.

As previously described, UEs making Voice over New Radio (VoNR) calls from the 5G cell edge have a high risk of experiencing bad call quality and call drops. To prevent this, the UE is forced by the 5G core network (5GC) during the voice call setup to switch to a LTE/EPS connection where the radio conditions are better for the voice service. The same problems also occur when the UE is served by a 5G cell that is not configured or optimized for VoNR calls or when the UE does not have all needed VoNR capabilities. To implement this procedure, the 5G radio connection may be released after the initial call attempt is successfully finished and the base station 104 may send a control signal to the UE 102 for reselecting to a 4G cell where a new radio connection is started for the VoLTE call. The UE context may then be transferred from the AMF 132 to the MME 130 over the N26 interface. In further embodiments, the session management and user plane tunnels in the core network may also be handed over from SMF/UPF to MME/S-GW. These procedures introduce a call setup delay of approximately two seconds.

To eliminate this delay, the fallback module 106A of the UE 102 may include instructions to define a call initiation event to trigger taking or sending a measurement report 110 from the UE 102 to the base station 104 in response to initiating a call from the UE. Various events for measurement report triggering for the UE 102 may be described in 3GPP TS 38.331 "Radio Resource Control (RRC) protocol specification" (available at: https://portal.3gpp.org/desktopmodules/Specifications/SpecificationDetails.aspx?specificationId=3197). To optimize EPS fallback procedures, instructions of the system 100 may define a call initiation event that causes the processor 108 to send a control signal to the fallback module 106A upon initiating a voice services request of the voice services module 107A to the base station 104 from the UE 102. In some embodiments, instructions of the UE 102 may initiate the procedure when the voice services module 107A causes upper layers to request establishment of a Radio Resource Control (RRC) connection. For example, the UE 102 may send a control signal to the base station 104 including a command to establish an RRC connection and a measurement report 110. The control signal from the UE 102 may include an "RRCSetupRequest" instruction for the base station 104 with the measurement report 110. The base station 104 may also include instructions to perform a number of actions upon receiving the "RRCSetupRequest" message and establish voice services with the UE 102. For example, the instructions may include analyzing the measurement report 110 to determine an optimal channel for 4G EPSFB. An optimal channel may include a frequency indicated in the measurement report 110 as having one or more of the highest signal strength and reliability. Once the base station 104 determines an optimal channel, the base station 104 may send a control signal to the UE 102 to join the optimal channel via a "RRCSetup" message. Further instructions of the UE 102 may send an "RRCSetupComplete" message back to the base station 104 once the UE 102 has established communications with the optimal channel indicated in the measurement report 110.

Figure 2:
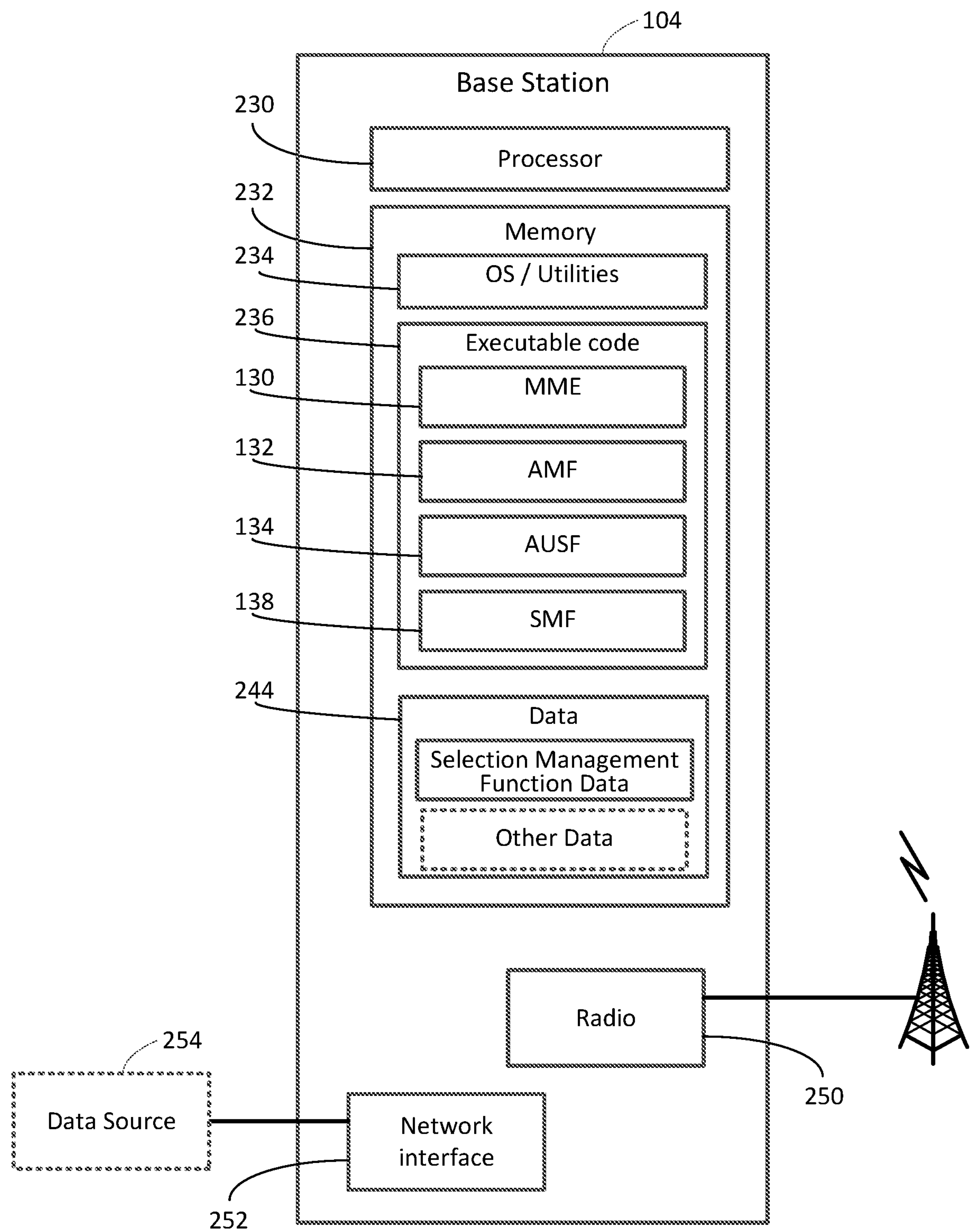
FIG. 2 is an illustration of an exemplary base station in accordance with the current disclosure.

FIG. 2 illustrates an exemplary block diagram of a base station 104 in accordance with the current disclosure. The base station 104 may include a processor 230 that is in communication with a memory 232. The memory 232 may include an operating system and utilities 234 used to manage operations of the base station including booting, memory management, communications, UE registration, error handling, software updates, etc. The memory 232 may also store processor-executable instructions 236 and data 244.

The base station 104 may have a radio 250 operating at a frequency band that provides for a coverage area 106 (FIG. 1) larger than that of another frequency band in use by the network base station 104. For example, another base station may operate in a frequency band in the 700 MHz frequency range with a larger coverage radius. In many prior art systems, wide area coverage was provided by an overlapping network of similar band radios, operating at up to 2.5 GHz, but having similar coverage areas. 4G LTE is such an example. In such systems, the UE 102 may tell one base station when it is getting a stronger signal from another base station so that a handoff between base stations can be executed.

However, in the new 5G (fifth generation cellular) standard, a mixed system of low band (e.g., 700 MHz base stations) may be intermixed with millimeter wave radios operating in frequency bands around 50 GHz. These so called NR (new radio) radios may have a coverage radius of 500 meters or less depending on terrain and other obstructions. Unlike previous systems, the 5G implementation mixes these bands with significantly different coverage areas. The base station 104 may also include a network interface 252 used for routing traffic from land-based switch gear (not depicted). The network interface 252 may also communicate with an external data source 254.

The executable instructions 236 may include various modules or routines that are used for registering UE and establishing VoEPSFB services as described herein. The memory 232 may include one or more of the MME 130, the AMF 132, the AUSF 134, and the SMF 138. The data 244 may include Session Management Function Data 140, and other data such as Session Management Subscription data 141, a Data Network Name Array 142, etc. The data 244 may also include coverage coordinates or descriptors, capabilities (e.g., 2G, 3G, 4G, or 5G, narrow band, etc.) of the coverage areas of the base stations and coverage coordinates for other base stations (not depicted) having small coverage areas compared to that of the other network base stations.

Figure 3:
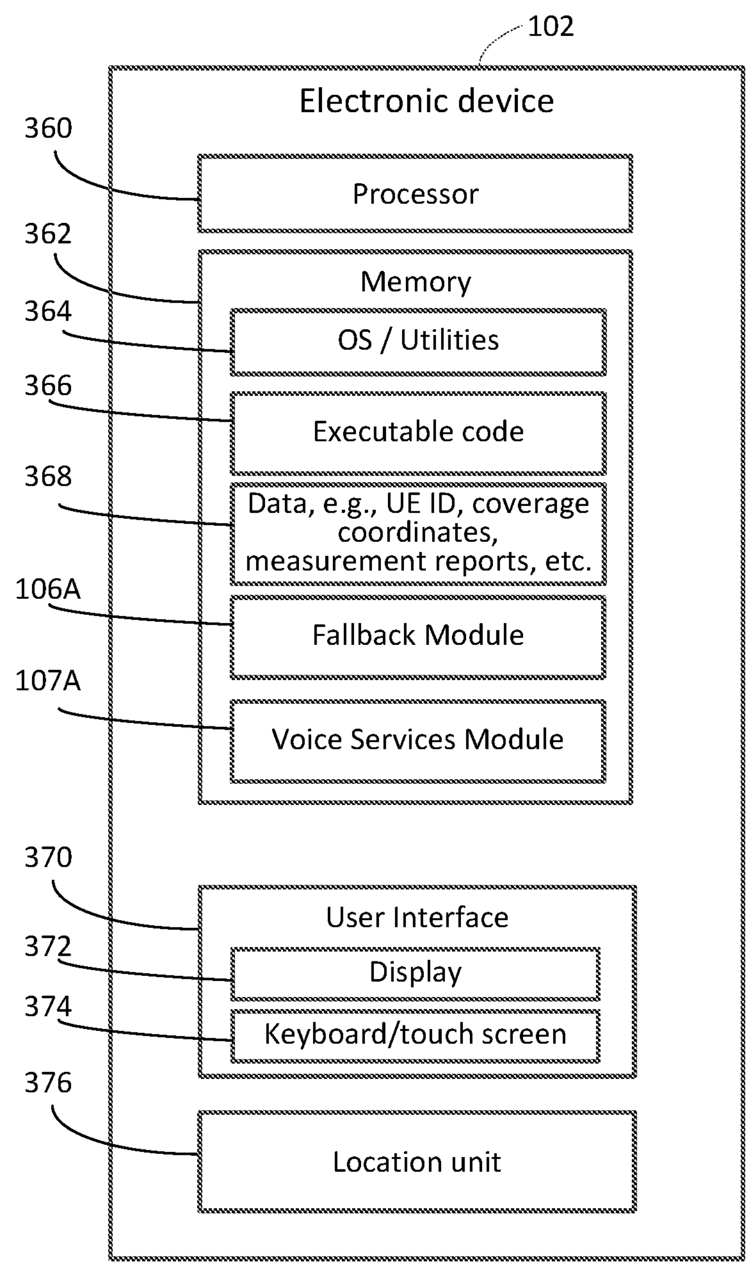
FIG. 3 is an illustration of user equipment in accordance with the current disclosure.

An embodiment of a UE 102 may be illustrated in FIG. 3. The UE 102 may be a cellular telephone, a tablet, a laptop, IoT device, etc. In other cases, the UE 102 may be any of a number of items that increasingly rely on network connectivity, such as a smartphone, internet of things device, vehicle, or other device. The UE 102 may include a processor 360 and memory 362 including an operating system and utilities 364, executable code 366 that may include both native and downloaded applications, and data memory 368. The data memory 368 may include a UE ID (e.g., subscriber identification or SUPI, a Permanent Equipment Identifier of PEI, a Globally Unique Temporary Identifier or GUTI, a subscription concealed identifier or SUCI, an Internal Group Identifier, a General Public Subscription Identifier, an access point name (APN) or a data network name (DNN) linked to its IP address, etc.) and specific device capabilities, such as coordinates or a descriptor as described above. The data memory 368 may also include the measurement report 110 as described herein. The UE 102 may also include a user interface 370 that itself may incorporate a display 372 and input device 374 such as a keyboard or touchscreen.

A location unit 376 may include a GPS receiver but may also rely on cell tower triangulation, Wi-Fi positioning (WPS), or other location techniques. Unlike the currently disclosed system, Wi-Fi positioning may require a mobile device to constantly monitor for Wi-Fi SSID and MAC addresses and use those with an external database to infer the location of the device from the location the Wi-Fi access point.

Figure 4:
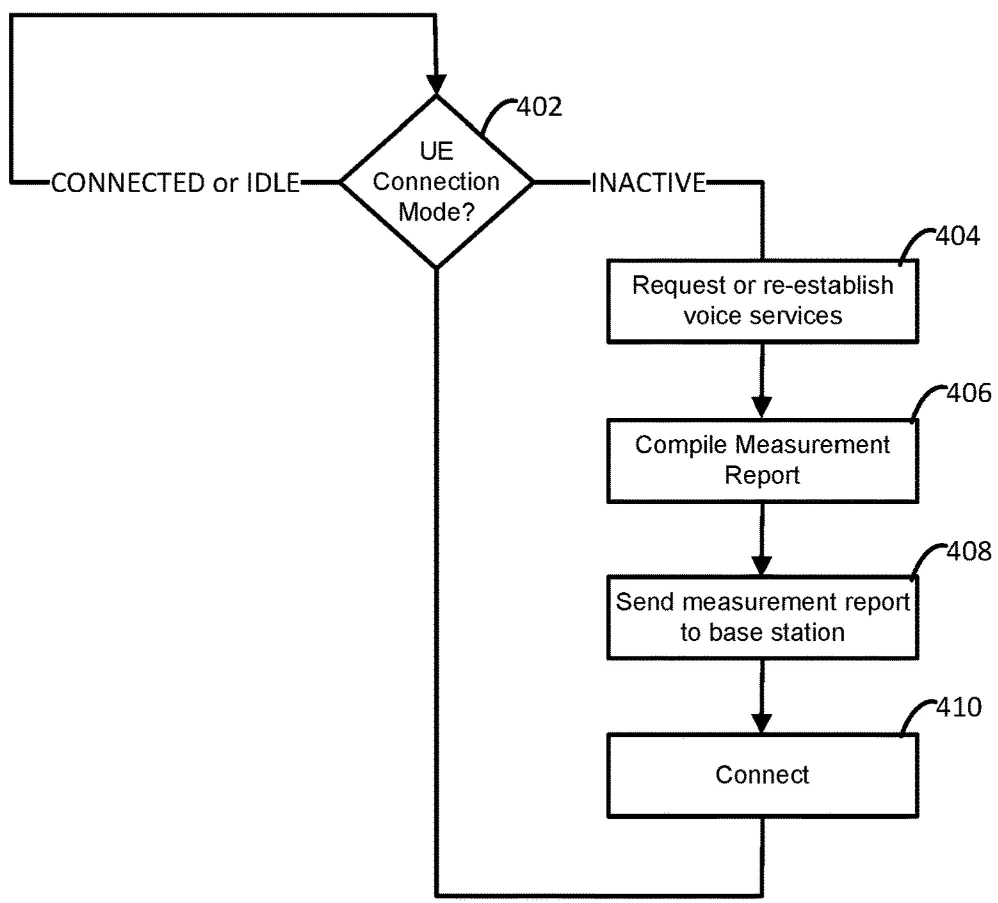
FIG. 4 is an illustration of a flow chart for a method moving 5G UE to 4G LTE in accordance with the current disclosure.

FIG. 4 is a flowchart of a computer-implemented method 400 for completing one or more processes for completing a “fallback” procedure between a 5G-capable UE 102 and a base station 104. As described herein, logic in the 5G UE may send a measurement report 110 to the 5G base station 104 (i.e., gNB) while the 5G SA UE 102 is going through a call setup requiring “fallback” (e.g., VoEPSFB). A new event and measurement report 110 may convey the most current available frequencies (3G, 4G, 4G LTE, etc.) to the 5G base station 104 while the 5G UE 102 is going through a call setup. This measurement report 110 may allow the 5G base station (g-NB) 104 to know which frequency is going to be the best choice at the time of setting up the voice service by looking at radio signal strength indicators and other measurements or data coming from the 5G UE 102 for each frequency in the measurement report 110. That way, a 5G base station 104 can make the right choice to automatically send a control signal to the 5G UE 102 to join the optimal LTE frequency instead of sending a blind choice of any available 4G frequency based on prior measurement reports that frequently include out-of-date information or incomplete. Using the measurement report 110 sent by the UE 102 upon voice services initiation, the 5G base station 104 may optimally control a 5G UE 102 without having available frequencies to support the requested service (e.g., voice services) in 5G NR. The 5G base station 104 may cause the 5G UE 102 to move to a strong and reliable radio signal strength indicated in the measurement report 110 to make voice calls over 4G using that stronger signal. As such, the 5G UE 102 may have faster call setup time by having such enhanced logic in 5G UE 102 so that it proactively helps the 5G base station 104 to assign it to the right frequency during a voice call setup. Incorporating the measurement report process into the logic of the 5G UE 102 for call setup that also includes the fallback process may result in substantially faster call setup time as well as better voice call success rate.

Each step of the method 400 is one or more computer-executable instructions (e.g., modules, blocks, stand-alone instructions, etc.) performed on a processor of a server or other computing device (e.g., base station 104, UE 102, other computer system illustrated in FIG. 1 and/or described herein) which may be physically configured to execute the different aspects of the method. Each step may include execution of any of the instructions as described in relation to the system 100 as part of the cellular network registration systems and methods described herein or other component that is internal or external to the system 100. While the below blocks are presented as an ordered set, the various steps described may be executed in any particular order to complete the methods described herein.

At block 402, the computer-implemented method 400 may determine a connection mode for the UE 102. As described above, the RRC protocol is used to control radio connections between the UE 102 and the base station 104. A state machine defines three different RRC states: inactive, idle, and connected. When the UE 102 is in connected or idle mode, the method 400 may continue to monitor the connection mode at block 402. When the UE 102 is in inactive mode, the method 400 may cause the system 100 to execute an instruction to request or re-establish services (e.g., the RRC connection) at block 404. For example, the UE 102 may execute instructions to send an "RRCSetupRequest" message that includes the measurement report 110 to the base station 104. Execution of block 404 may trigger a call initiation event for a measurement report 110. The call initiation event may cause the method 400 to execute instructions of block 406 to compile a measurement report 110. In some embodiments, the method 400 may execute instructions of block 406 to compile the measurement report 110 in response to or upon the UE requesting or re-establishing services. Execution of block 406 may cause the UE 102 to compile the measurement report 110 including data indicating frequencies that are currently being received by the UE 102, a signal strength for each of those frequencies, an indication of a standard for the signal (e.g., 4G LTE, 4G, 3G, etc.), a duration of signal reception at the UE 102, a measure of signal reliability either at the UE 102 or other data that may be determined from past measurement reports 110, among other information. In some embodiments, the signal strength is indicated in decibel-milliwatts (dBm) in the measurement report. In some embodiments, frequency is indicated on the measurement report 110 in gigahertz (GHz). In other embodiments, frequency may be indicated in any other suitable units of measurement.

At block 408, the method 400 may send the measurement report 110 to the base station 104. In some embodiments, the measurement report 110 is sent from the UE 102 to the base station 104 with an "RRCSetupRequest" message. In response to the measurement report 110 and other setup instructions, the base station 104 may send a control signal to the UE 102 to attach to the optimal frequency indicated in the measurement report 110 that was sent to the base station at block 404. In some embodiments, the control signal includes an "RRCSetup" message from the base station 104.

At block 410, in response to execution of block 408, the UE 102 may execute instructions to attach to the to the optimal frequency indicated in the measurement report 110. In some embodiments, the UE 102 may cause its processor to execute instructions to enter an "RRC_CONNECTED" state, stop the cell re-selection procedure, set the contents of an "RRCSetupComplete" message, and send that message to the base station 104. Once the UE 102 is connected to the optimal frequency indicated in the measurement report 110, the method 400 may return to block 402 to continue monitoring for the UE 102 to enter the inactive state.

Thus, the present application describes a technical solution to the technical problem of call setup delays, signal drops, and other issues during fallback procedure from 5G to 4G protocols. Logic in the 5G UE 102 may send a measurement report 110 to the 5G base station 104 (i.e., gNB) in response to the event of the 5G SA UE 102 initiating a call setup using VoEPSFB. This new type of event and measurement report 110 may convey the most current available frequencies (3G, 4G, 4G LTE, etc.) to the 5G base station 104 while the 5G UE 102 is going through a call setup. This measurement report 110 may allow the 5G base station 104 (g-NB) to know which frequency is going to be the best choice at the time of setting up the voice service by looking at radio signal strength indicators coming from the 5G UE 102 for each frequency in the measurement report 110. That way, a 5G base station 104 can make the right choice to automatically send a control signal to the 5G UE 102 to join the optimal LTE frequency instead of sending a blind choice of any available 4G frequency based on prior measurement reports or other data that frequently include out-of-date information. Using the measurement report 110 compiled and sent by the UE 102 upon voice services initiation, the 5G base station 104 may optimally control 5G UE 102 without having available frequencies to support the requested service (e.g., voice services) in 5G NR. The 5G base station 104 may cause the 5G UE 102 to move to a strong and reliable radio signal strength indicated in the measurement report 110 to make voice calls over 4G using that stronger signal. As such, the 5G UE 102 may have faster call setup time by having such enhanced logic in 5G UE 102 so that it proactively helps the 5G base station 104 to assign it to the right frequency during a voice call setup. Incorporating the measurement report 110 process into the logic of the 5G UE 102 for call setup that also includes the fallback process for 5G UE 102 may result in substantially faster call setup time as well as better voice call success rate.

Additionally, certain embodiments are described herein as including logic or a number of components, modules, blocks, or mechanisms. Modules and method blocks may constitute either software modules (e.g., code or instructions embodied on a machine-readable medium or in a transmission signal, wherein the code is executed by a processor) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a processor configured using software, the processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within an environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within an environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "an embodiment" or "teaching" means that a particular element, feature, structure, or characteristic described in connection with the embodiment is included in at least one embodiment. The appearances of the phrase "in some embodiments" or "teachings" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Further, the figures depict preferred embodiments for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. An apparatus for completing a fallback process between a base station and a user equipment in a cellular network, the apparatus comprising:

a user equipment including a processor and a memory storing instructions for execution by the processor for:

sending a request to initiate a 5G voice service procedure with the base station;

upon sending the request to initiate the 5G voice service procedure with the base station:

determining a signal strength for each of a plurality of fallback frequencies being received by the user equipment;

generating a measurement report including the signal strength for each of the plurality of fallback frequencies being received by the user equipment;

sending the measurement report to the base station;

receiving a control signal from the base station; and attaching, in response to the control signal from the base station, to an optimal one of the plurality of fallback frequencies at the user equipment, the optimal one of the plurality of fallback frequencies having a highest signal strength of each of the plurality of fallback frequencies indicated by the measurement report;

wherein the control signal indicates that a frequency for a 5G service corresponding to the 5G service procedure is not supported by the base station.

2. The apparatus of claim 1, wherein the measurement report further includes a reliability for each of the plurality of frequencies being received by the user equipment.

3. The apparatus of claim 2, wherein the optimal one of the plurality of frequencies includes a frequency indicated in the measurement report as having a highest signal strength and reliability.

4. The apparatus of claim 3, wherein the base station is further configured to automatically send a further control signal to the user equipment in response to receiving the measurement report, the further control signal for the user equipment to receive communication on the optimal one of the plurality of frequencies.

5. The apparatus of claim 1, wherein the user equipment is configured to process a 5G NR signal.

6. The apparatus of claim 1, wherein the measurement report includes data indicating one or more of frequencies that are currently being received by the user equipment, a signal strength for each of the one or more frequencies, an indication of a standard for each of the one or more frequencies, the standard for each of the one or more frequencies including one of 4G LTE, 4G, and 3G, a duration of signal reception for each of the one or more frequencies at the user equipment, a measure of signal reliability for each of the one or more frequencies at the user equipment.

7. The apparatus of claim 1, wherein determining the signal strength for each of the plurality of frequencies being received by the user equipment includes determining the signal strength for each of the plurality of frequencies being received by the user equipment when the user equipment enters an inactive state.

8. The apparatus of claim 1, wherein sending the measurement report to the base station upon sending the request to initiate the service corresponding to the measurement report includes sending the measurement report with an RRCSetupRequest message.

9. The apparatus of claim 1, wherein the control signal includes an RRCSetup message.

10. The apparatus of claim 1, further comprising sending an RRCSetupComplete message to the base station in response to the user equipment attaching to the optimal one of the plurality of frequencies in response to the RRCSetup message.

11. A computer-implemented method for completing a fallback process between a base station and a user equipment in a cellular network, the computer-implemented method comprising:

sending a request from the user equipment to initiate a 5G voice service procedure with the base station;

upon sending the request to initiate the 5G voice service procedure with the base station, at the user equipment:

determining a signal strength for each of a plurality of fallback frequencies being received by the user equipment;

generating a measurement report including the signal strength for each of the plurality of fallback frequencies being received by the user equipment;

sending the measurement report to the base station;

receiving a control signal from the base station at the user equipment;

attaching, in response to the control signal from the base station, to an optimal one of the plurality of fallback frequencies at the user equipment, the optimal one of the plurality of fallback frequencies having a highest signal strength of each of the plurality of fallback frequencies indicated by the measurement report;

wherein the control signal indicates that a frequency for a 5G service corresponding to the 5G service procedure is not supported by the base station.

12. The computer-implemented method of claim 11, wherein the measurement report further includes a reliability for each of the plurality of frequencies being received by the user equipment.

13. The computer-implemented method of claim 12, wherein the optimal one of the plurality of frequencies includes a frequency indicated in the measurement report as having a highest signal strength and reliability.

14. The computer-implemented method of claim 13, further comprising receiving a further control signal from the base station at the user equipment in response to receiving the measurement report, the further control signal for the user equipment to receive communication on the optimal one of the plurality of frequencies.

15. The computer-implemented method of claim 11, wherein the user equipment is configured to process a 5G NR signal.

16. The computer-implemented method of claim 11, wherein the measurement report includes data indicating one or more of frequencies that are currently being received by the user equipment, a signal strength for each of the one or more frequencies, an indication of a standard for each of the one or more frequencies, the standard for each of the one or more frequencies including one of 4G LTE, 4G, and 3G, a duration of signal reception for each of the one or more frequencies at the user equipment, a measure of signal reliability for each of the one or more frequencies at the user equipment.

17. The computer-implemented method of claim 11, wherein determining the signal strength for each of the plurality of frequencies being received by the user equipment includes determining the signal strength for each of the plurality of frequencies being received by the user equipment when the user equipment enters an inactive state.

18. The computer-implemented method of claim 11, wherein sending the measurement report to the base station upon sending the request to initiate the service corresponding to the measurement report includes sending the measurement report with an RRCSetupRequest message.

19. The computer-implemented method of claim 11, wherein the control signal includes an RRCSetup message.

20. The computer-implemented method of claim 11, further comprising sending an RRCSetupComplete message to the base station in response to the user equipment attaching to the optimal one of the plurality of frequencies in response to the RRCSetup message.

* * * * *